No. 735,018. Patented July 28, 1903.

UNITED STATES PATENT OFFICE.

ROBERT R. HITE, OF WICHITA, KANSAS.

PROCESS OF TREATING TREES OR PLANTS.

SPECIFICATION forming part of Letters Patent No. 735,018, dated July 28, 1903.

Application filed February 6, 1903. Serial No. 142,216. (No specimens.)

*To all whom it may concern:*

Be it known that I, ROBERT R. HITE, a citizen of the United States, residing at Wichita, in the county of Sedgwick and State of Kansas, have invented certain new and useful Improvements in Processes for the Treatment of Trees; and I do hereby declare the following to be a full, clear, and exact description of the invention, such as will enable others skilled in the art to which it appertains to make and use the same.

My invention relates to a process for the treatment of trees, more especially fruit-trees.

The object of my invention is to so treat trees, vines, shrubs, and plants generally that they will not be attacked by insects and, furthermore, that any insects that remain on or in the plants after they have been treated will be killed.

In carrying out my invention I mix one gallon of methyl alcohol with one pound of bichloride of mercury or corrosive sublimate, although I do not confine myself to these exact proportions. These ingredients are thoroughly mixed together and applied to the plants, as follows: Any time after the leaves fall or just before the sap starts in the spring a root of the plant is uncovered and a small hole bored therein. Then with an ordinary dropper from six to twelve drops of the composition mentioned above are dropped into the hole, the amount varying with the size of the plant, care being taken that none of the solution is allowed to get outside of the hole or upon the hands of the user. The mixture should be thoroughly shaken before it is dropped into the hole in the root of the plant. The hole is then closed up with grafting-wax to prevent evaporation and to keep the composition within the root of the plant, so that it will be absorbed by the sap and distributed throughout the plant.

In case it is difficult to obtain access to the root the hole may be bored in the body of the plant, preferably near the ground.

When the sap begins to run in the spring, the composition is diffused throughout the entire plant, the result being that insects will not usually attack the plant, and if they do they will be killed by the poison. I have also found out that by the method described herein insects in the plant—such as borers, worms, &c.—will be killed.

The composition used has not the slightest injurious effect on the fruit.

Having thus described my invention, what I claim as new, and desire to secure by Letters Patent of the United States, is—

1. The process of treating trees and plants, which consists in supplying to the interior thereof a mixture of alcohol and corrosive sublimate, substantially as described.

2. The process of treating trees and plants, which consists in boring a hole into them under the surface of the ground, dropping into the hole thus formed a mixture of methyl alcohol and corrosive sublimate, and stopping up the hole, substantially as described.

In testimony whereof I affix my signature in presence of two witnesses.

ROBERT R. HITE.

Witnesses:
JOHN D. DAVIS,
J. B. CULVER.